United States Patent Office 2,905,462
Patented Sept. 22, 1959

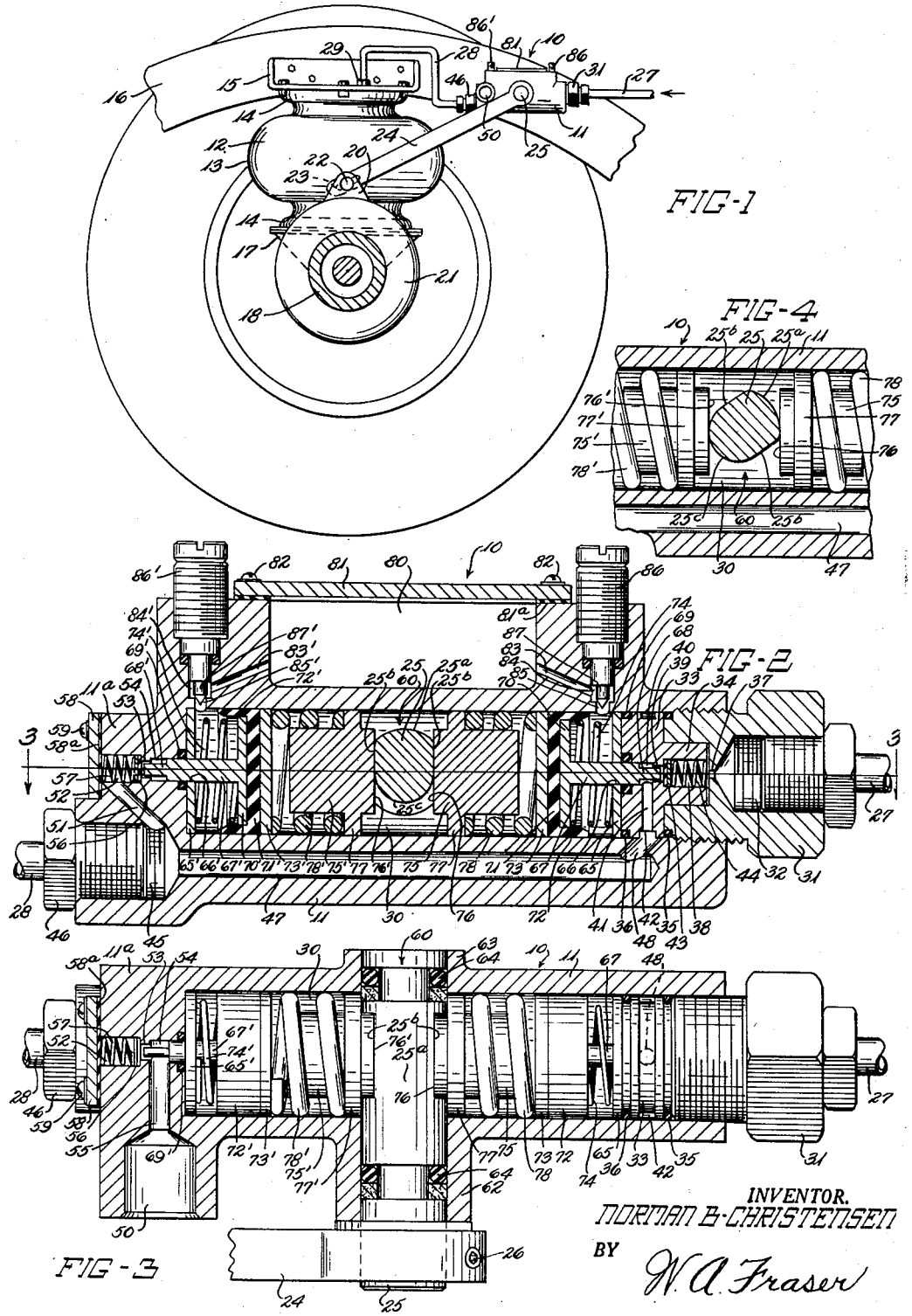

2,905,462
CONTROL DEVICE FOR VEHICLE SUSPENSION

Norman B. Christensen, North Olmsted, Ohio, assignor to Republic Manufacturing Co., Cleveland, Ohio, a corporation of Ohio Application April 23, 1956, Serial No. 579,906

1 Claim. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs to maintain a predetermined height between the road gear and frame of the vehicle. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein an adjustable time delay so that momentary alteration of the static load on the suspension system, such as would be encountered during normal axle movement due to road irregularities, will not cause the valve to supply or exhaust air. This time delay feature is often referred to as "damping" and preferably is adjustable over a time range of from 1 to 20 seconds, as determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a novel time delay or "damping" feature, and is operative under extremes of temperature, humidity and other environmental conditions.

A further object is to provide an improved valve and control means located remotely of the air springs and embodying therein a novel adjustable time delay or damping component to prevent excessive operation of the valve, which is accurately responsive to persistent changes in vehicle loading, and which is of simple, relatively uncomplex construction.

A further object is to provide a novel time delay or damping mechanism for use with an air spring control valve.

These and other objects will be apparent in view of the following detailed description of the invention considered with the attached drawings:

In the drawings:

Fig. 1 is a vertical sectional view through a vehicle axle showing in elevation a portion of the vehicle equipped with a pneumatic suspension system according to the invention;

Fig. 2 is a longitudinal section of the valve and control means;

Fig. 3 is a sectional view, taken substantially on line 3—3 of Fig. 2; and,

Fig. 4 is a fragmentary view, showing the valve actuating shaft in a rotated position.

In the present invention a ride control valve means, indicated generally by the numeral 10, includes a housing 11, generally rectangular in cross section, which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upperside of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 20 which may be located atop the vehicle differential housing 21, has a bolt 22 therethrough, which bolt extends through an elongated longitudinal slot 23 formed in the lower end of a control valve actuating rod 24, so that rod 24 is slidably mounted on bolt 22. The upper end of the actuating rod is fixed to one end of a control valve actuating shaft 25 and secured thereon by a set screw 26, said shaft being mounted for rotation in housing 11 in a manner to be described. The housing 11 preferably is located above and to the rear of the horizontal plane of the axle, and is fastened by suitable means such as a bracket or bolts (not shown) to one of the longitudinal frame members 16.

Air, from a source under pressure (not shown), is supplied to the control device 10 by suitable piping 27 having a conventional check valve (not shown) therein so that air cannot back out. The control device is connected by suitable piping 28 to an air spring fitting 29, which extends through the frame member 15 into the interior of the air spring. The piping 28 is the conduit for supplying air to and exhausting air from the air spring 12, through the control device 10, as referred to later.

Referring to Figs. 2 and 3, the housing 11 is provided with a substantially horizontal central bore or chamber 30 which opens exteriorly of one end of the housing. Threaded into the open end of bore 30 is an air supply fitting 31 having an air supply port 32 into which the piping 27 communicating with the air supply is adapted to be secured. Inwardly of the fitting 31, the bore 30 has mounted therein a valve ring 33 having an outwardly extending hub portion 34 (Fig. 2) that fits snugly within the shank portion of fitting 31. O-rings 35 and 36 are carried on the outer peripheries of the fitting 31 and valve ring 33, respectively, to provide a fluid tight seal.

Referring to Fig. 2, the air supply piping 27 communicates with the interior of the housing 11 through a small diameter orifice 37 in the end wall of fitting 31, an enlarged diameter valve chamber 38 within the hub 34 of the valve ring, a short smaller diameter bore 39 in the valve ring concentric with the valve chamber, and an axial bore 40 in the valve ring concentric with bore 39. Communicating with the bore 40, and extending radially of the valve ring 33 to its outer surface, is a lateral bore 41 which opens into an annular groove or passage 42 in the outer periphery of the valve ring.

To control the passage of compressed air from the piping 27 to the air spring 12, as described in detail below, a valve 43 is seated at the inner end of chamber 38 against the shoulder provided by the short bore 39. Valve 43 is in the form of a flat, reinforced air impermeable member, and a small coil spring 44, bearing between the valve and the fitting 31 has a normal bias tending to keep the valve seated. Valve 43 is suitably shaped to cover orifice 39 when seated, and may be square, hexagonal, star shaped, round, or any other shape that would permit the passage of air around the valve.

At the end 11a of the housing, opposite of the fitting 31, is a two-way bellows port 45. A fitting 46 connected to the piping 28 communicating with the air spring 12 is threaded into the port 45. The bellows port connects at its inner end with an elongated passageway 47 extending transversely of the housing 11. The other end of passageway 47 connects with a short diagonal passage 48 which communicates with the annular passage 42 of the valve ring. Thus, the orifice 37, chamber 38, small bore 39, axial bore 40, lateral bore 41, annular passage 42, diagonal passage 48, passageway 47 and the bellows port 45 define the conduits through which compressed air passes from the supply port 32 interiorly of the housing 11 to the air spring 12.

The bellows port 45 also communicates, interiorly of the housing end 11a, with an exhaust port 50 vented to the atmosphere. Referring to Fig. 2, the inner end of the bellows port has a diagonal passage 51 opening therein. The upper end of the passage 51 is in communication with a valve spring chamber 52, similar to chamber 38 in the valve ring 33. Referring to Fig. 3, the chamber 52 communicates with the exhaust port 50 through a smaller diameter bore 53 similar to bore 39, an axial bore 54 similar to bore 40, and a lateral bore 55 similar to bore 41. Thus, the bellows port 45, the passage 51, chamber 52, small bore 53, axial bore 54, and lateral bore 55 define the conduits through which exhaust air passes from the air spring 12 interiorly of the housing 11 to the exhaust port 50.

To control the exhaust of air from within the air spring 12, as described in detail below, a valve 56 is seated at the inner end of chamber 52 against the shoulder provided by a short bore 53. Valve 56 is similar to valve 43 and a small coil spring 57 bearing between the valve and an end plate 58, tightly secured against the housing 11a by a gasket 58a and suitable screws 59, has a normal bias tending to keep the valve seated.

The valves 43 and 56 are selectively unseated, to admit air to or exhaust air from the air spring 12 as referred to below, by the movement interiorly of the housing 11 of a valve actuating means indicated generally by the numeral 60. The valve actuating means 60 is responsive to rotation of the shaft 25 extending transversely through the central bore 30, which is preferably filled with a fluid such as hydraulic brake fluid.

The end of shaft 25 connected to the actuating rod 24 is journaled for rotation in a boss 62. The other end of the shaft is journaled in a similar boss 63. Within bosses 62 and 63, suitable O-rings and gaskets, indicated at 64, provide a fluid tight seal around shaft 25. Within bore 30, the shaft 25 has an upper or cam surface 25a having a radius the same as or equal to the radius of the shaft ends journaled in bosses 62 and 63, parallel and substantially flat side surfaces 25b, and a bottom or stop surface 25c having a radius equal to half the width of the shaft 25 between surfaces 25b, which radius is less than that of surface 25a.

In the preferred embodiment of the control device 10 as shown and described, the several elements of the means 60 actuating valve 43 to admit air under pressure to the air spring 12 having substantially identical counterparts actuating valve 56 to exhaust air from the air spring. Hence, to avoid repetition of description the elements actuating valve 43 will be described in detail, and their identical counterparts actuating valve 56 will be indicated by the same numerals, but primed.

As best shown in Fig. 2, at the right hand end of the central bore 30, in abutting contact with the valve ring 33 and O-ring 36, is an end plate 65. The end plate is fitted snugly within bore 30 and has a hole 66 therethrough in concentric alignment with the axial bore 40 in the valve ring. The valve 43 is unseated by a piston rod 67 inserted within bore 40, through hole 66, and having a reduced outer stem or end 68 movable through the smaller bore 39. Within the valve ring, an O-ring 69 surrounds the piston rod 67 to provide a fluid tight seal.

Attached to the inner end of the rod 67 is a piston plate 70. The plate 70 is fitted within a conventional "C-type," or collapsible brake gasket, piston cup 71. The cup 71 is of neoprene, leather or other suitable material, and has a circumferential lip 72 extending toward the end plate 65. The cup 71 is so constructed that when moved toward the end plate, the lip 72 is tightly pressed against the walls of the bore 30 providing a fluid tight seal. However, when the cup is moved toward the shaft 25, the lip 72 collapses sufficiently to allow small quantities of fluid to flow around the cup. Opposite of the piston plate 70 the cup is in abutting contact with a keeper plate 73, loosely fitted within bore 30 so as to be movable therein.

Surrounding the rod 67, and seated between the plate 65 and the piston plate 70, is a coiled compression spring 74 having a normal bias strongly urging the piston plate away from the end plate 65 and toward the shaft 25.

The piston structure, consisting of the keeper plate 73, the piston cup 71, the piston plate 70, the piston rod 67 and the actuating stem 68, is moved away from the shaft 25 by a plunger 75 having a flat end 76 normally contacting a side surface 25b of the shaft. The plunger 75 is supported by a bearing ring 77 in sliding engagement with the wall of the central bore 30. The end 76 of the plunger is maintained in contact at all times with the shaft by a coiled compressed spring 78 seated between the keeper plate 73 and the bearing ring 77.

The elements of the actuating means 60 which accomplish the unseating of valve 56 to exhaust air from within the air spring 12 are indicated by the numerals 65'–78' inclusive. The valve 56 is unseated by the piston rod 67' inserted within the bore 54, through hole 66' in the end plate 65', and having a reduced stem 68' movable through the smaller bore.

Referring to Fig. 2, the hydraulic or other suitable fluid which damps or opposes movement of the actuating means 60 within the central bore 30 is supplied from a reservoir or chamber 80 in the upper portion of the housing 11. The chamber is closed by a removable top plate 81 secured to the housing by a gasket 81a and suitable screws 82. Leading outwardly and down from opposite sides of the chamber are passages 83 and 83' which open into valve chambers 84 and 84'. The lower end of each valve chamber is in communication with a short vertical bore 85 or 85'. The bore 85 is in communication with the area between the piston plate 70 and the end plate 65. The bore 85' is in communication with the area between the piston plate 70' and the end plate 65'.

Adjustably mounted within each chamber 84 and 84' are identical needle valves, 86 and 86', respectively. Each needle valve has a stem portion, 87 or 87', which may be located within the upper end of bores 85 and 85', respectively, so as to vary the amount of fluid passing into and from the chamber 80, as described below.

The operation of the control device 10 is as follows:

Assume that the normal static load in the vehicle suspension requires that the air spring 12 be inflated to a pressure of about 50 p.s.i. At this pressure, valve 43 will be seated against bore 39 by spring 44 and valve 56 will be seated against bore 53 by spring 57.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the control device 10 also moves downwardly. Such downward movement of the control device causes the actuating shaft 25 to be turned by the actuating rod 24, the lower end of which is slidably attached to the differential housing 21, to permit sliding movement of the rod as the control device moves downwardly. That is, as the distance between the member 15 and the axle housing 18 decreases, the rod 24 will cause the shaft 25 to be rotated within the bore 30.

As viewed in Figs. 1 and 2, an increased load will cause the shaft 25 to rotate in a clockwise direction to supply air under pressure to the air spring 12. As the shaft 25 is rotated so as to assume the position shown in Fig. 4, the cam surface 25a will displace the plunger 75 to the right, compressing spring 78. While the plunger 75 is being displaced, the counterpart plunger 75' will remain stationary in contact with the shaft surface 25c. Plunger 75' remains stationary because of the smaller radius of surface 25c of the shaft which does not change the distance between plunger 75' and the center of shaft 25 from which the arc of surface 25c is projected. The spring 78 will resist the compression force by reacting against the movable keeper plate 73. The keeper plate will in turn react against the piston cup 71 and piston plate 70 so as to cause the piston rod 67 to move to the right and the spring 74 to become compressed. During such movement, the lip 72 of the piston cup will flare outwardly into fluid tight engagement with the walls of the central bore 30.

As described above, the areas of the central bore 30 between the keeper plates 73 and 73' and to the right of the piston cup 71 are fluid filled. As the piston cup moves to the right, fluid will be displaced ahead of the piston cup, upwardly through the bore 85 into chamber 84 and through passage 83 into the chamber 80 which is substantially filled with the fluid. The speed of horizontal movement of the piston cup is determined and controlled by the position of the needle valve stem 87 in bore 85.

As the piston rod 67 moves to the right, so does the reduced stem 68 which will pass through the small bore 39 causing the valve 43 to be unseated and allowing additional air to pass into the axial bore 40, and then through the various passages to the air spring 12. This additional air must be under a greater pressure than the air already in the air spring 12, and will extend the air spring to its initial position.

As the air spring extends, the frame members 15 and 16 move upwardly from the axle housing 18, causing shaft 25 to be turned by the actuating rod 24 in a counter-clockwise direction as viewed in Fig. 4. As the shaft begins to assume the normal position shown in Fig. 2, the shaft surface 25b will be presented to the plunger end 76 and the spring 78 will urge the plunger toward the shaft. Thus, the force which has been urging the piston rod 67 to the right will be reversed in direction and the spring 74 will urge the piston plate 70 to the left. As the piston cup 71 moves to the left, the area to the right of the cup will become enlarged in volume so that fluid from the chamber 80 is free to return. However, the rate of fluid return past the needle valve 86 is extremely slow. This factor is obviated by the lip 72 of the piston cup which will collapse slightly when moved toward the shaft 25 and allow the flow of fluid into the enlarging area between the piston cup and end plate from the decreasing area between the keeper plates 73 and 73'. This action moves the reduced stem 68 to the left and allows spring 44 to close valve 43, stopping the flow of additional air and maintaining the original position of the air spring.

If the static load on the vehicle suspension is decreased, the frame members 15 and 16 move upwardly away from the axle housing 18, causing the air spring to extend. During this upward movement of the frame members, the control device 10 also moves upwardly, causing shaft 25 to be turned by rod 24, in a counter-clockwise direction as viewed in Fig. 3, said rod sliding with respect to the bolt 22 as the device 10 moves upwardly.

As the shaft 25 is turned counter-clockwise on its axis, the ensuing action is identical but opposite that described above in connection with the actuation of valve 43. That is, the plunger 75' is moved to the left and the spring 78' causes the keeper plate 73', the piston cup 71', the piston plate 70', the piston rod 67', and the reduced stem 68' to also move to the left, compressing spring 74' and unseating valve 56. As the valve 56 is unseated, exhaust air is free to pass from the air spring 12 through the several passages to the exhaust port 50 and the atmosphere. The exhaust of air from within the air spring will contract the air spring to its normal position.

As the air spring contracts, the frame members 15 and 16 move downwardly toward the axle housing 18, causing shaft 25 to be returned by rod 24 to the normal position shown in Fig. 2. The ensuing action is similar to that described above in connection with the closing of valve 43. That is, the force moving the plunger 75' is reversed in direction, the piston cup 71' is moved toward the shaft 25 and the displaced fluid is returned to the area between the piston cup and the end plate 65'. This action allows spring 57 to close valve 56, stopping the exhaust of air and maintaining the normal position of the air spring.

When a vehicle equipped with a suspension system according to the invention is driven over rough roads with no change in the static loading, the vehicle wheels tend to move up and down over bumps and into holes in the road. This causes the shaft 25 to be quickly turned in either direction as the case may be. However, a quick turning of shaft 25 will not cause the various components of the control device 10 to react to supply or exhaust air because of the damping or time delay effect of the fluid, the piston cups 71 and 71', the spring 74 and 74', and the springs 78 and 78' upon movement of the piston rods 67 and 67'. Thus, the admission of additional air to or exhaust of air from the air spring 12 will not occur until a force is maintained in one direction for a predetermined period of time, which is adjustably controlled by the needle valves 86 and 86'.

The use of springs 74, 74', springs 78, 78', and needle valves 86, 86', acting cooperatively in the opening of valves 43 and 56, are features of the control device 10 which provide for more accurate selectivity and control of the time lag required for the damping function of the control device. After the several springs in the device are balanced, it will be found desirable to position the needle valves within bores 85 and 85' so as to provide a time lag of about 7 seconds before the valves 43 and 56 are opened. However, the time delay for both valves need not be the same and either may be selected from any place within the preferred range of from 1 to 20 seconds.

A shut off valve (not shown) can be provided in the air spring line 28 so that a mechanic can shut off the line when raising the vehicle by a jack or hoist to remove a tire.

The embodiment of the invention shown and described herein is particularly well adapted for use in vehicle suspension systems requiring a rapid rate of recovery after supplying or exhausting air to the air spring to cause it to assume the normal position (Fig. 2). However, in systems which do not require such a recovery rate, the piston cups 71 and 71' may be non-collapsible providing a constant fluid tight seal and the area of the central bore between the keeper plates 73 and 73' need not be filled with fluid. These, and other changes and modifications may be made in the invention without departing either from the spirit thereof or the scope of the subjoined claim.

What is claimed is:

Control means adapted for regulation of the supply and exhaust of air to and from an expansible bellows for a vehicle suspension system to maintain a predetermined height between the road gear and frame of the vehicle, comprising: a housing having a fluid filled central bore; first and second passages aligned with said bore at opposite ends thereof; an air supply port opening exteriorly of said housing and communicating with said first aligned passage; a ring within said bore having passages communicating with said first aligned passage; an air exhaust port opening exteriorly of said housing communicating with said second aligned passage; a two-way port adapted for connection with the interior of a bellows opening exteriorly of said second aligned passage; passageways interiorly of said housing connecting said ring passages and supply port with said two-way port; a first valve within said ring closing said supply port; a second valve within said second aligned passage closing said exhaust port; dual pistons in said bore between said valves, each piston including a resilient cup, the lips of which are in fluid tight contact with the walls of said bore when said cup is moved toward a valve, said lip collapsing when said cup is moved away from a valve, each piston further having a head portion fitted within said cup and a rod portion extending outwardly of said head portion adapted to unseat a valve, said rod portions being sealed against the passage of fluid into contact with said valves; piston actuating means in said bore between said pistons; a shaft adapted for rotation by relative movement between the road gear and frame of the vehicle journaled transversely of said bore between said piston actuating means for displacement thereof toward said pistons; a fluid reservoir chamber in said housing above said bore; and fluid passageways extending upwardly within said housing from either end of said bore outwardly of each piston head and communicating with said chamber, the size of said passageways determining the rate of movement of said pistons in response to rotation of said shaft.

References Cited in the file of this patent
UNITED STATES PATENTS

| | | |
|---|---|---|
| 2,075,600 | Baker | Mar. 30, 1937 |
| 2,656,854 | Douglas | Oct. 27, 1953 |
| 2,670,201 | Rossman | Feb. 23, 1954 |
| 2,674,266 | Gardner | Apr. 6, 1954 |